Figure 1:
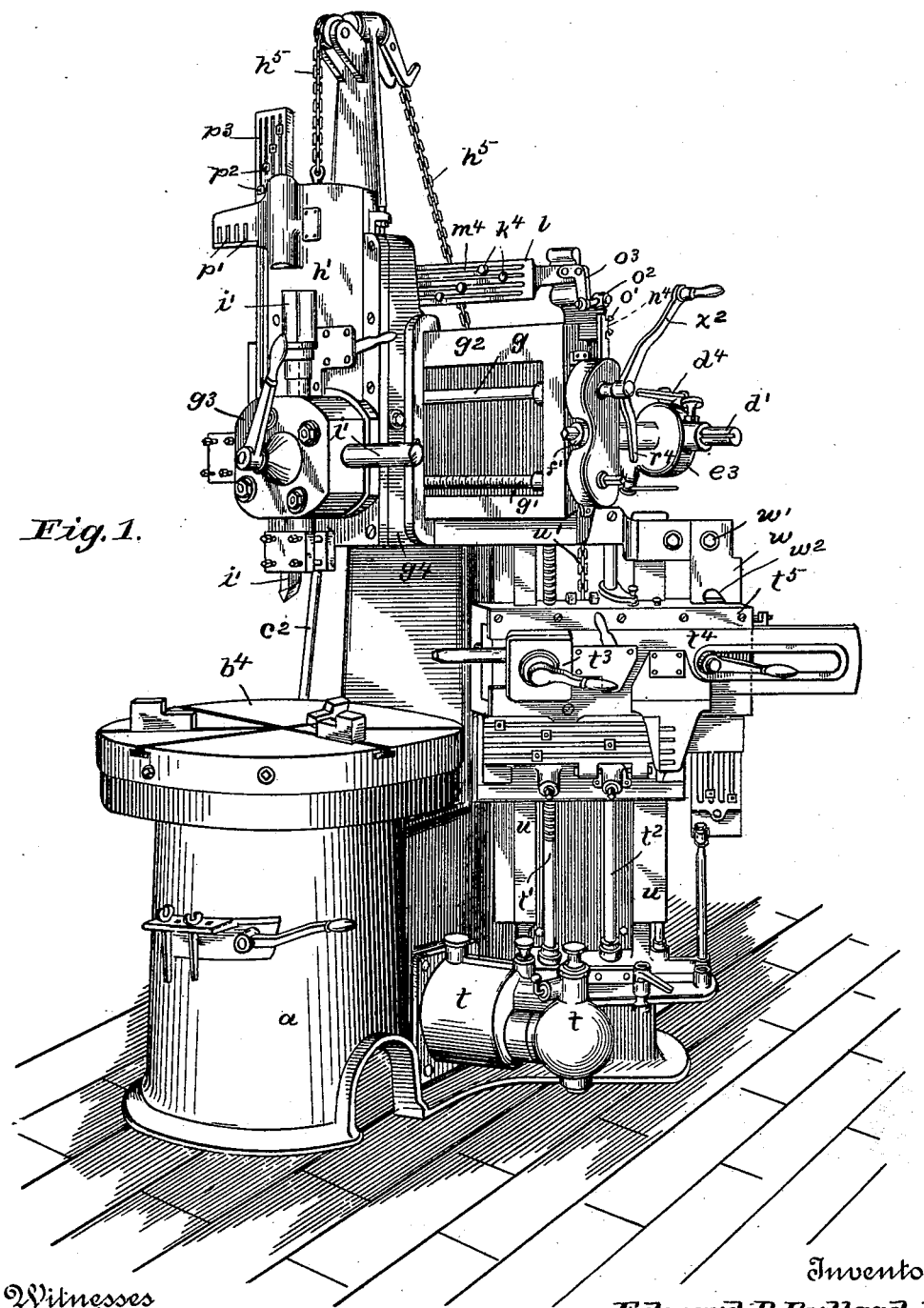

No. 683,592. Patented Oct. 1, 1901.
E. P. BULLARD, Jr.
VERTICAL TURRET LATHE.
(Application filed June 18, 1901.)

(No Model.) 10 Sheets—Sheet 2.

Witnesses
R. H. Newman
H. V. Devitt

Inventor
Edward P. Bullard Jr.
By
Chamberlain & Newman
Attorneys

THE NORRIS PETERS CO., PHOTO-LITHO., WASHINGTON, D. C.

No. 683,592. Patented Oct. 1, 1901.
E. P. BULLARD, Jr.
VERTICAL TURRET LATHE.
(Application filed June 18, 1901.)
(No Model.) 10 Sheets—Sheet 3.

Witnesses
R. H. Newman
H. V. Devitt

Inventor
Edward P. Bullard Jr.
By Chamberlain & Newman
Attorneys

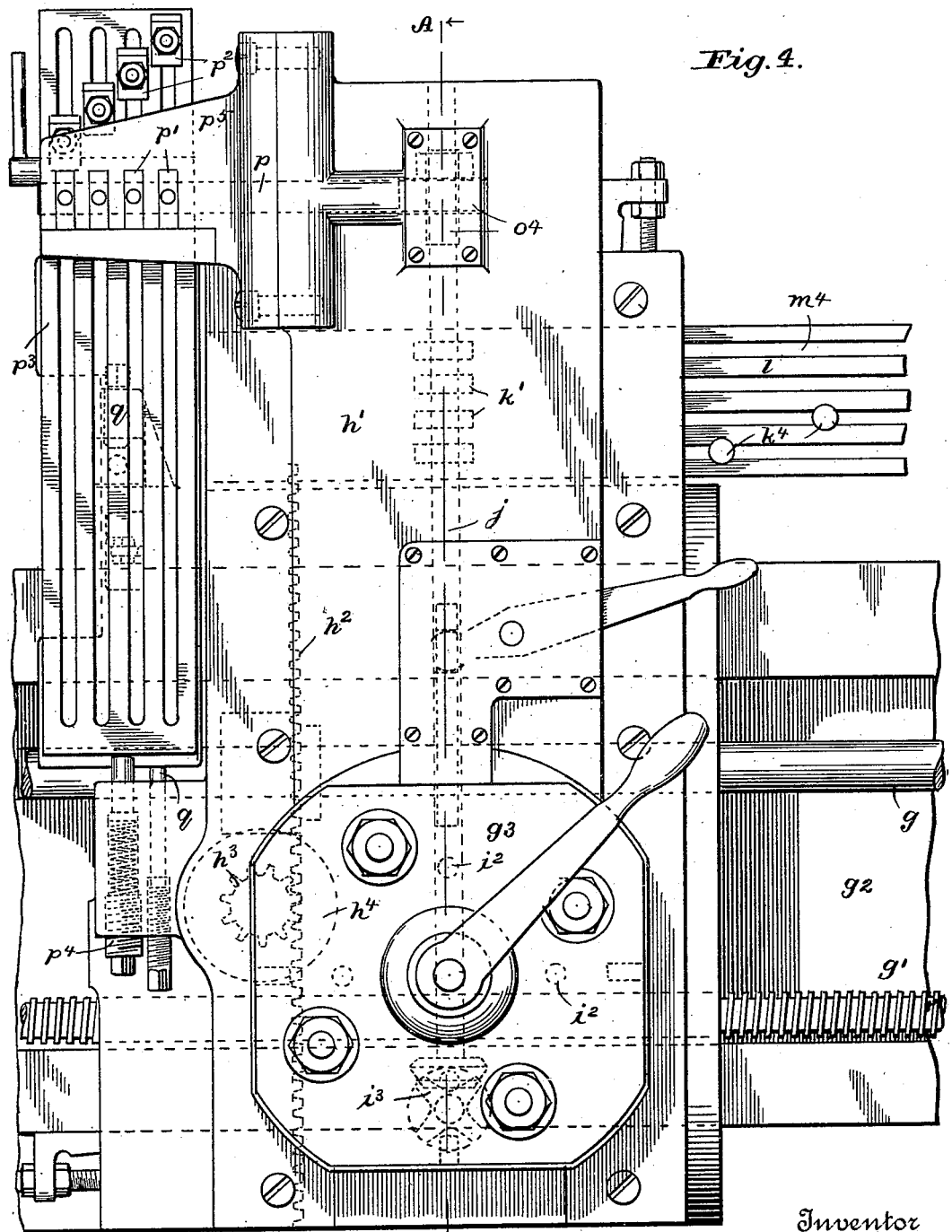

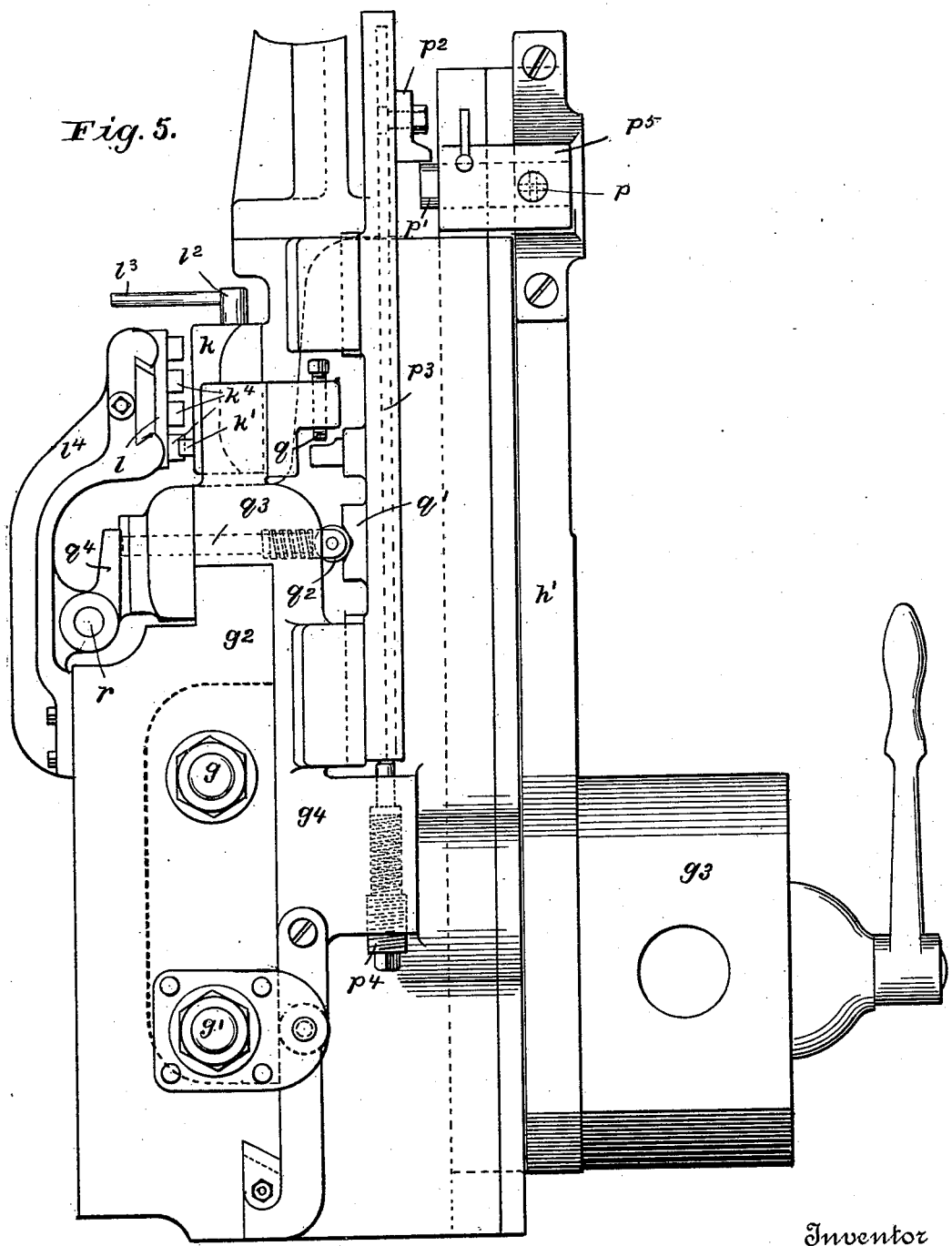

No. 683,592. Patented Oct. 1, 1901.
E. P. BULLARD, Jr.
VERTICAL TURRET LATHE.
(Application filed June 18, 1901.)
(No Model.) 10 Sheets—Sheet 6.

Witnesses
R. H. Newman
H. V. Devitt

Inventor
Edward P. Bullard Jr
By Chamberlain & Newman
Attorneys

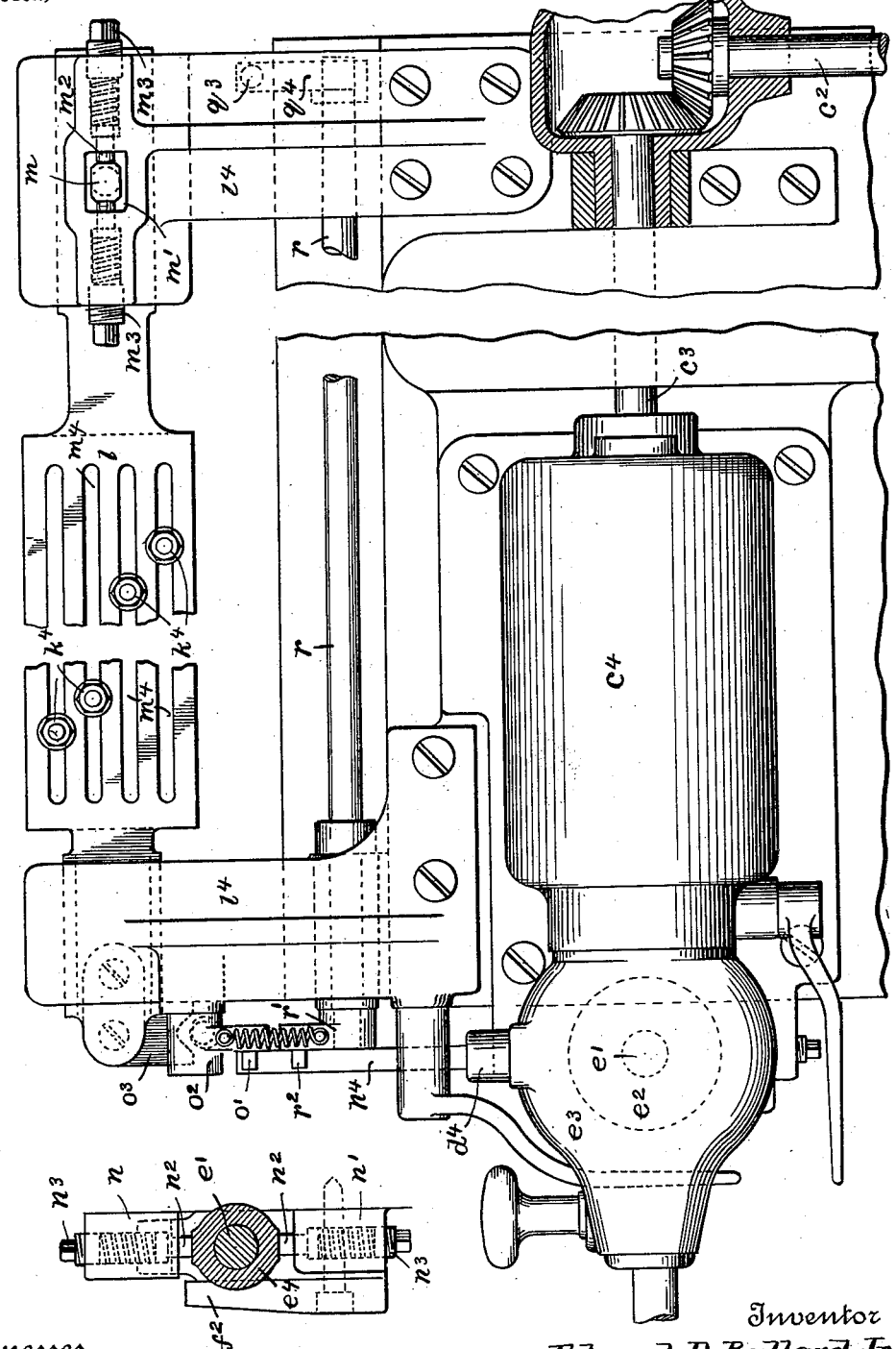

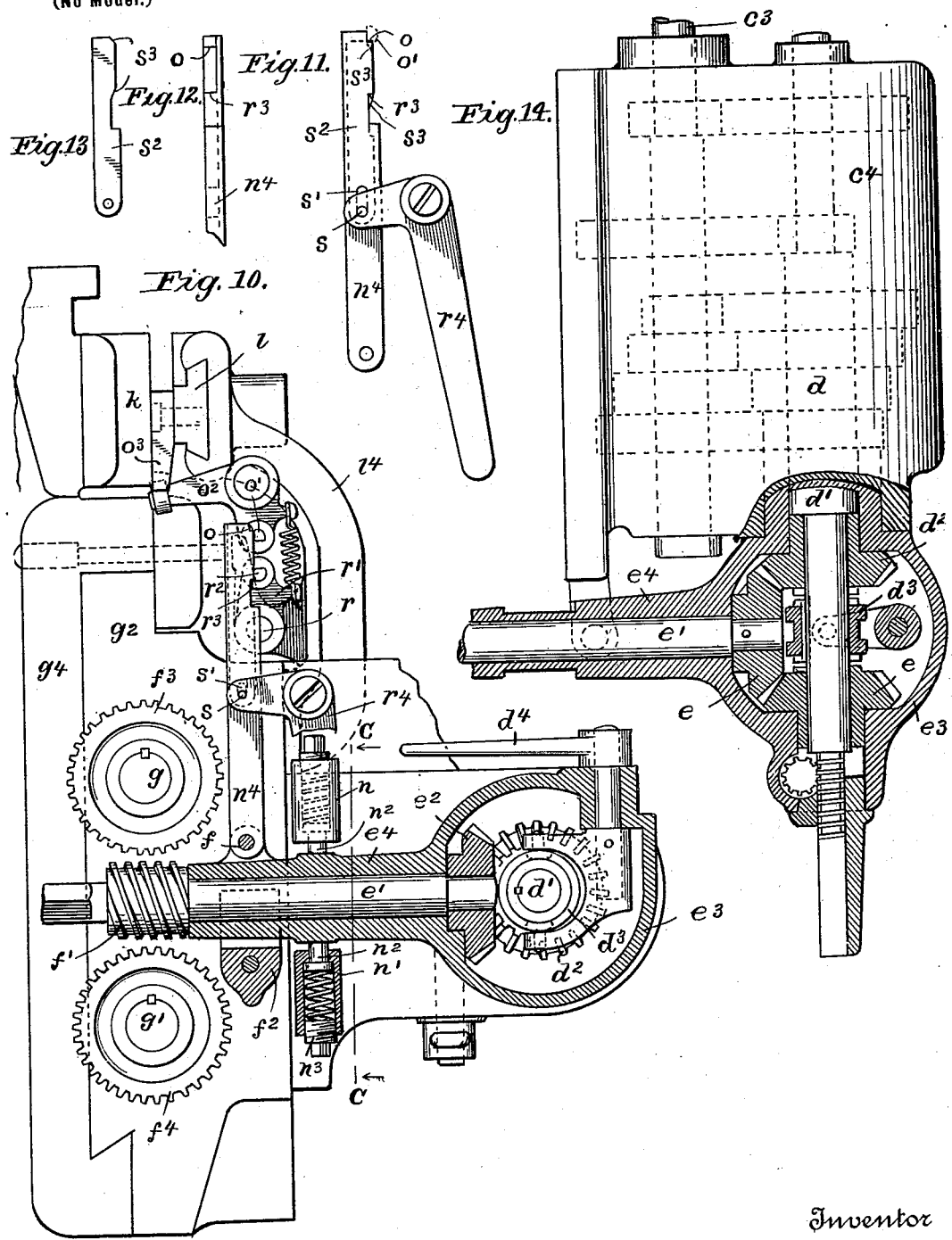

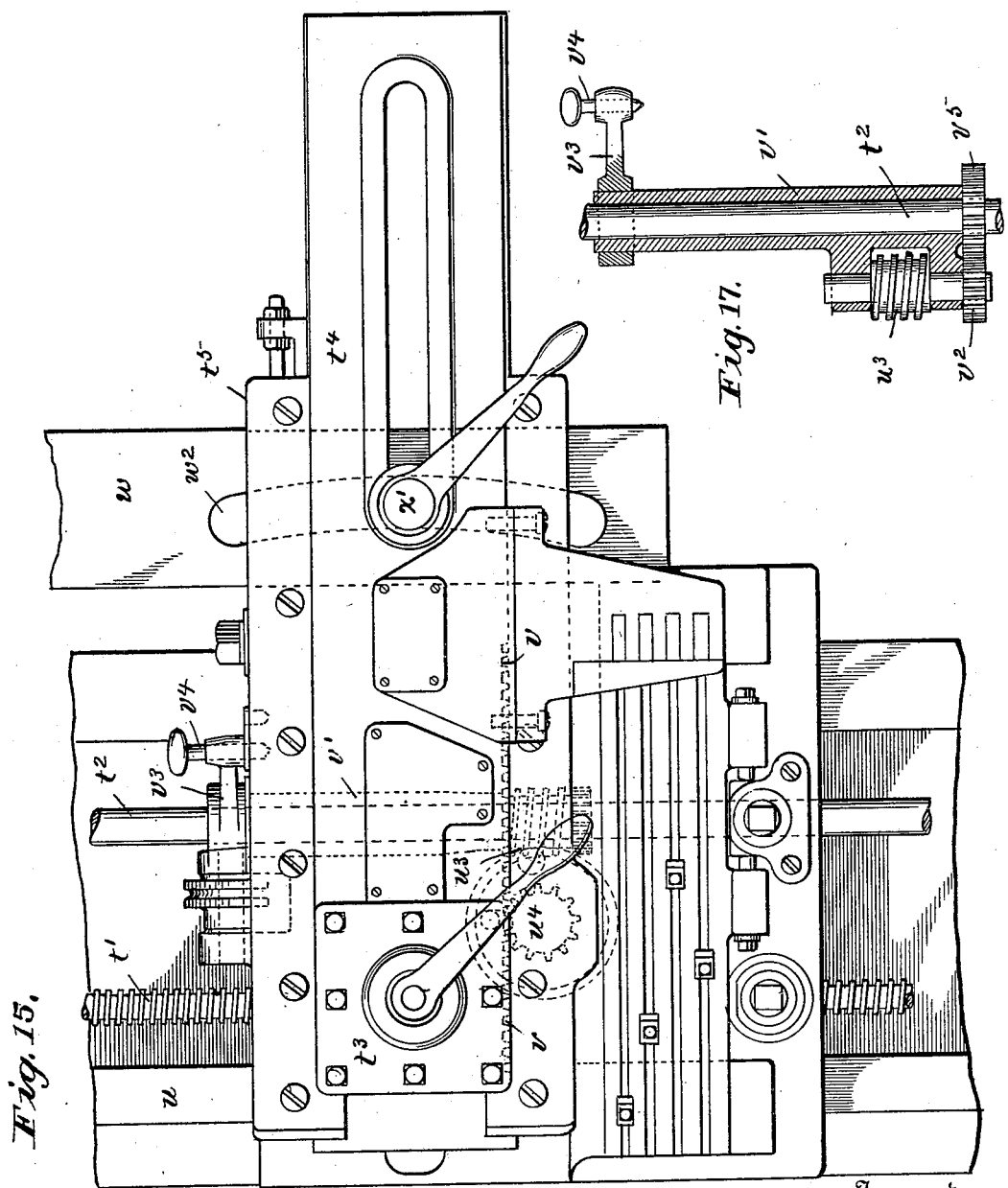

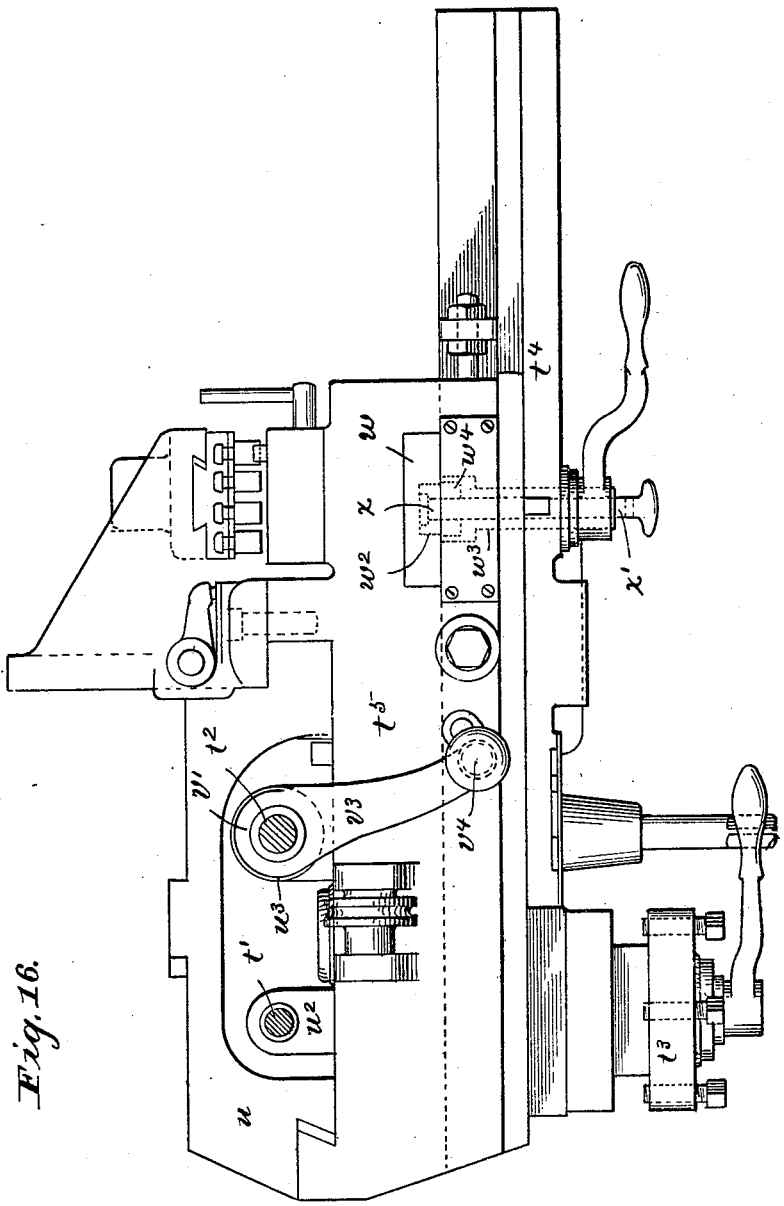

UNITED STATES PATENT OFFICE.

EDWARD PAYSON BULLARD, JR., OF BRIDGEPORT, CONNECTICUT, ASSIGNOR TO THE BULLARD MACHINE TOOL COMPANY, OF SAME PLACE.

VERTICAL TURRET-LATHE.

SPECIFICATION forming part of Letters Patent No. 683,592, dated October 1, 1901.

Application filed June 18, 1901. Serial No. 65,025. (No model.)

*To all whom it may concern:*

Be it known that I, EDWARD PAYSON BULLARD, Jr., a citizen of the United States, and a resident of Bridgeport, in the county of Fairfield and State of Connecticut, have invented certain new and useful Improvements in Vertical Turret-Lathes, of which the following is a specification.

My invention relates to certain new and useful improvements in upright lathes, the same employing both a vertically and horizontally movable top tool-head and a vertically and horizontally movable side tool-head in connection with a vertical rotary table.

It is the object of my invention to provide a machine which shall be particularly adapted to finish a large range of cylindrical work, including special designs requiring both exterior and interior finishing; further, to provide a machine which shall be particularly adapted for finishing various styles of large pulleys without having to remove the same to a second or third machine, as is now frequently necessary. My machine as constructed is therefore capable of not only boring out the hub of the pulley, but also of milling the face of said hub and pulley-flange, producing a tapering finish on each, if desired.

A further object of my invention is to provide in connection with machines of this class a series of automatic adjustable stops whereby the several tools of the turret-head may be permitted to operate to a predetermined point and then stopped and whereby the stop mechanisms for the several tools may be adjusted to act either independently of or with special relation to each other. Finally, to accomplish the foregoing means in a manner that does not require resetting for duplicate operations.

With the above objects in view my invention resides and consists in the novel construction and combination of parts shown upon the accompanying ten sheets of drawings, forming a part of this specification, upon which similar characters of reference denote like or corresponding parts throughout the several figures, and of which—

Figure 2:
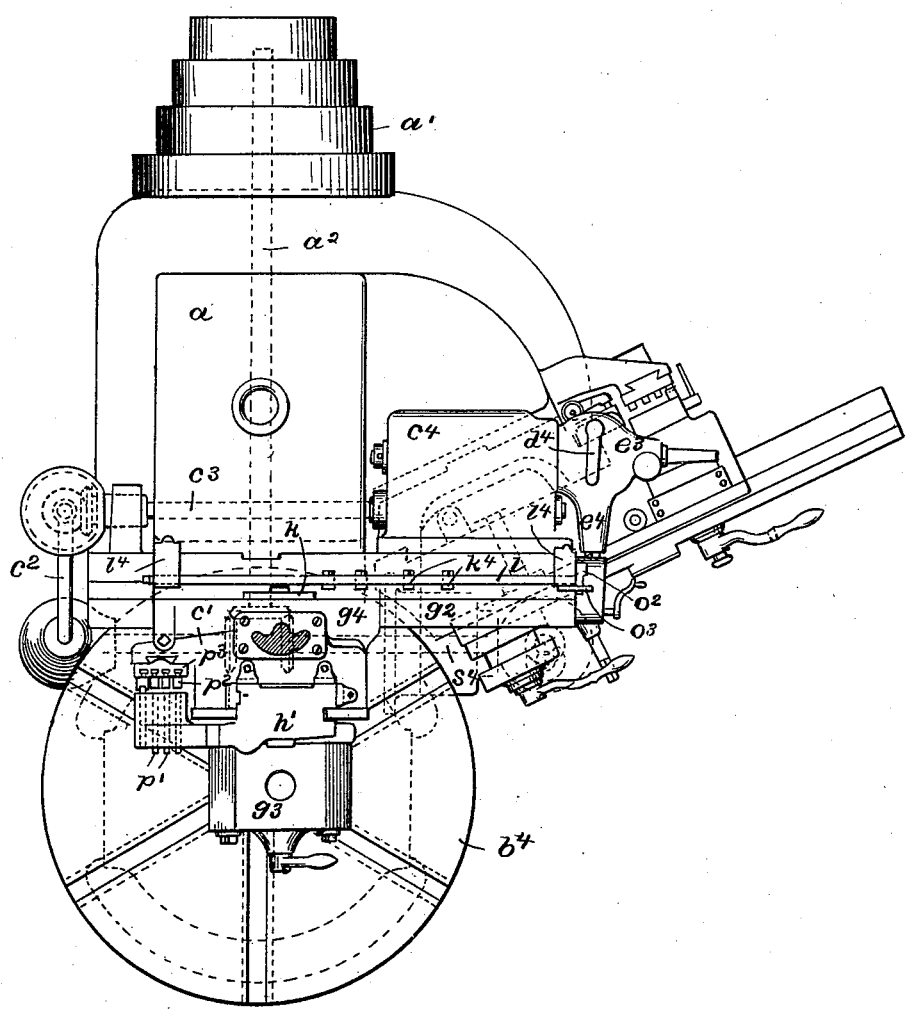
Figure 3:
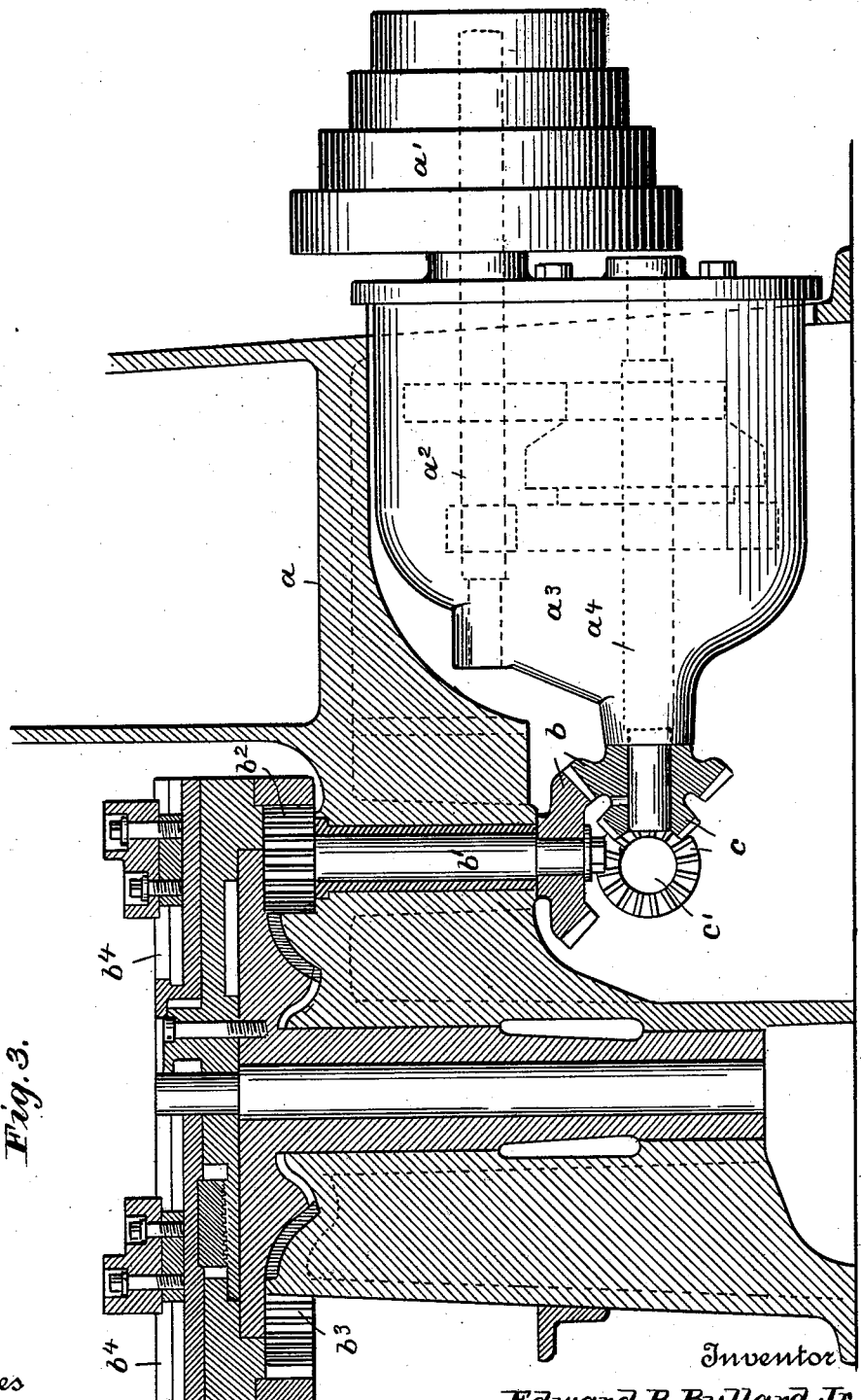
Figure 7:
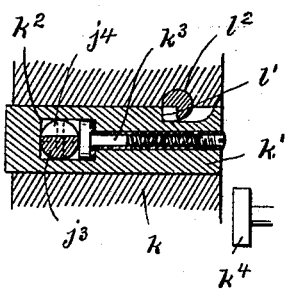
Figure 6:
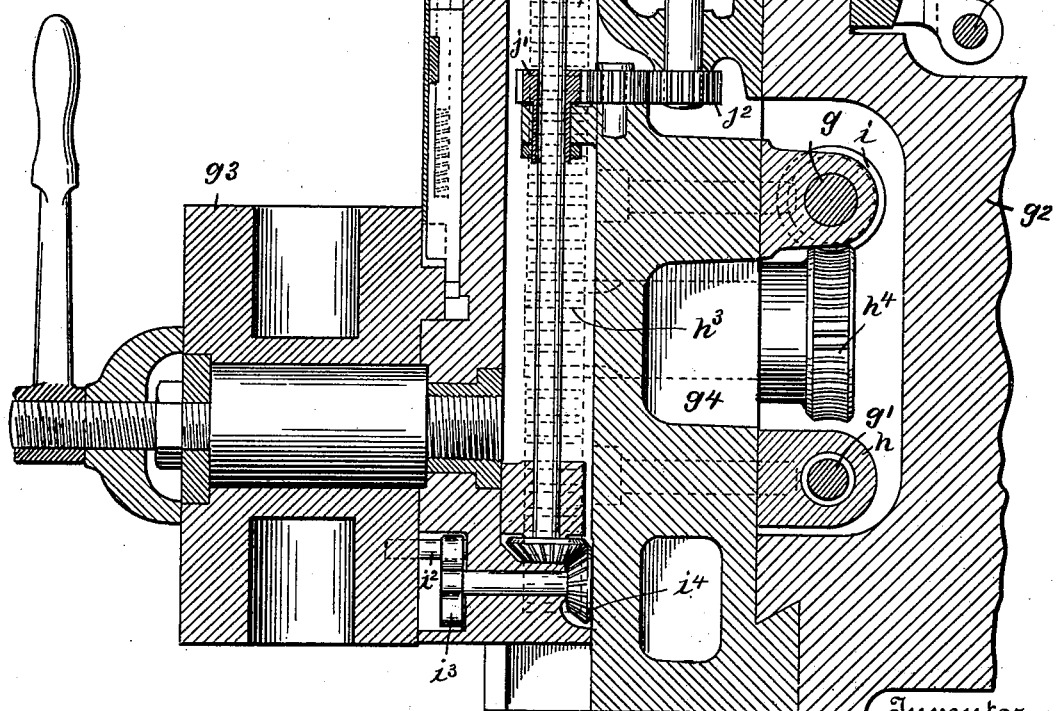

Figure 1 shows a diminutive front perspective view of a machine embodying my invention. Fig. 2 is a plan view of the same. Fig. 3 is a central longitudinal section through the lower portion and table of the machine. Fig. 4 is a detail front elevation of the front turret-head and slide. Fig. 5 is a side view as seen from the left of the head and slide shown in Fig. 3. Fig. 6 is a central vertical section of the front turret-head, taken on line A A of Fig. 4. Fig. 7 is a detail sectional view taken on line B B of Fig. 6. Fig. 8 is a detail elevation broken away, as seen from the rear of Figs. 1 and 2. Fig. 9 is a detail cross-section taken on line C C of Fig. 10. Fig. 10 shows an end elevation of the cross-rail for the turret-head slide as seen from the right of Figs. 1 and 2, with some of the connections therefor in section. Figs. 11, 12, and 13 are detail side views of lever, link, and slide, shown in the preceding views on the end of cross-rail. Fig. 14 is a plan view of the casing shown in Fig. 7 and illustrating in section the clutch device, also shown in Fig. 10. Fig. 15 is a front elevation of the side turret-head slide and forming attachment. Fig. 16 is a side view of Fig. 15. Fig. 17 is a detail section of means employed in the side head for disconnecting its vertical feed mechanism.

Referring in detail to the characters of reference marked upon the drawings, $a$ represents the base or main casing of the machine, $a'$ the cone driving-pulley, and $a^2$ the main shaft, upon which said pulley is mounted. This shaft is provided with suitable gearing and clutch mechanism, (not shown,) but inclosed by a casing $a^3$, whereby a forward or backward rotary movement may be imparted to shaft $a^4$. From this shaft $a^4$ the several parts of the machine are operated through gear connections, which will later be separately followed out and described.

Referring to Fig. 3, it will be seen that the shaft $a^4$ is provided with bevel-gear connections $b$ to a vertical shaft $b'$, journaled in the main frame and having a spur-gear $b^2$ on its upper end. This spur-gear in turn meshes with an internal-faced gear $b^3$, secured to the under side of the table $b^4$, which table is rotatably mounted in the main frame. This table serves as a support for the stock (not shown) to be operated upon, which in practice is clamped therein and turns therewith. The connection with shaft $a^4$ for operating the front turret-head $g^3$ is made through bevel-pinions $c$. (See Fig. 2.) The driven member of these pinions is mounted on a horizontal shaft $c'$ and in turn is connected with and drives a vertical shaft $c^2$. Power is next transmitted to a horizontal shaft $c^3$, which is rotatably journaled in the rear of the frame of the machine. Connected with this shaft $c^3$ is a variable-speed device, which is inclosed by a casing $c^4$, as shown in Figs. 2, 8, and 14. The purpose of this mechanism is to secure, as is the custom in machines of this class, different speeds, whereby the parts driven therethrough may be operated at any given rate. However, since it forms no material part of this invention I will omit a detailed illustration and description of it. It will be apparent, however, from the illustrations given that a series of gear connections $d$ are made with a shaft $d'$, also journaled in the casing $c^4$ and provided with a bevel-gear $d^2$. This bevel-gear is loosely journaled upon the shaft $d'$ and is provided with a clutched face for engagement by a clutched sleeve $d^3$, keyed to the shaft $d'$ and adapted to be shifted to and fro upon said shaft by reason of connections therewith from a hand-lever $d^4$. (See Figs. 10 and 14.) Upon the opposite side of the clutch-sleeve $d^3$ is a second bevel-gear $e$, loosely mounted upon the shaft $d'$ and provided with a clutched face for engagement with the clutch-sleeve $d^3$ when the latter is operated thereagainst. It will thus be seen that either of the gears $d^2$ or $e$ can be operatively connected with the shaft $d'$ by shifting the clutch-sleeve, thereby imparting either a forward or backward movement to the worm-shaft $e'$ through its gear $e^2$. Said gears, clutch, and the shaft $e'$ are all suitably inclosed in a casing $e^3$, which, as will be seen, is pivotally mounted in the casing $c^4$ and is consequently free to turn slightly in its bearing for a purpose which will later be referred to. The casing $e^3$ is provided with an extension $e^4$ to inclose the shaft $e'$ and is also provided with a pivotal lug $f$, to which connections are made and which I will later describe for raising and lowering the shaft and its worm $f'$ in its guide $f^2$. This worm thus engages and disengages the gears $f^3$ and $f^4$, situated above and below it on shafts $g$ and $g'$. The shafts $g$ and $g'$ are suitably journaled in the front cross-rail $g^2$ of the machine, and the upper one serves to move the turret-head $g^3$ upward or downward, as desired, while the screw-shaft $g'$ affords the desired lateral movement for said head. As shown in Fig. 10, the worm $f'$ is shown in an intermediate position, neither of the gears being engaged. Consequently it will be assumed that the parts on the cross-rail are in a position of rest. If the worm were raised into engagement with the top gear, a vertical movement would be imparted to the head until such times when the worm is automatically released by a novel stop mechanism, which I will later describe. The same is also true if the worm were connected with the gear of the screw-shaft below, that being also provided with automatic mechanism for disconnecting the worm.

Referring to Figs. 1, 2, 4, and 6, it will be seen that upon the cross-rail $g^2$ is mounted a saddle $g^4$, provided with a lug-nut $h$ (see Fig. 6) for engagement with a lateral screw-shaft $g'$. Therefore it will be apparent that as the screw-shaft is operated in one direction the saddle will move accordingly upon the rail, while if the shaft is operated in the opposite direction the movement of the saddle will likewise be reversed. The turret-head $g^3$ is rotatably mounted on the face of a vertical slide $h'$, which is fitted in suitable ways of the saddle $g^4$, mounted upon the cross-rail. This vertical slide is provided with a rack $h^2$, (see dotted lines, Figs. 4 and 6,) which engages a pinion $h^3$, mounted upon a short shaft journaled in the saddle and having a worm-gear $h^4$ upon its opposite end, (see Fig. 6,) the latter being driven by a worm $i$, mounted upon the feed-shaft $g$, before mentioned. The weight of this slide is counterbalanced in the usual manner by a weighted chain connection $h^5$. (See Fig. 1.) It will thus be apparent that the turret-head and its slide can be raised or lowered through the shaft $g$ and its connections. This turret-head is of the usual construction, being adapted to turn upon the face of the slide and locked in any desired position, and carries several operating-tools $i'$, (shown in Fig. 1,) which can be used separately for certain work or successively for other classes of work, as may be required. Inasmuch as there are three or four tools in the head, each of which may be designed to perform a different operation or to perform certain portions of an operation, it is necessary to provide special connections whereby the movement of the head for the several tools may be predetermined and whereby when once set they can be made to repeat the operation on duplicate work. These connections consist, first, in providing a pin $i^2$ upon the under side of the turret-head for each tool carried thereby. These pins engage and operate a star-wheel $i^3$, mounted in the slide in a manner to turn the wheel one-quarter of a rotation with each quarter-turn of the head. The rear end of the star-wheel shaft is provided with a bevel-pinion $i^4$, which engages a similar pinion upon a vertical shaft $j$, mounted in the slide. From this shaft second connections are made—one for manipulating the stops for controlling the movement of the feed-shaft $g$, while the other likewise controls the screw feed-shaft. The broad principles involved in these two sets of mechanism are substantially alike; but in order to insure a thorough understanding of one of the essential features of my invention I will describe them both, referring first to that set which controls the feed-shaft and lateral movement of the saddle and head.

To the shaft $j$ is movably splined a pinion $j'$, which operates a pinion $j^2$ through an idler journaled upon a stud secured to the saddle. This pinion $j^2$ is mounted upon a vertical shaft $j^3$, having specially-shaped notches $j^4$ formed in the four sides thereof. The connections between the shaft $j^3$ and turret-head are such that they turn together, the shaft making a complete rotation with a complete turn of the head. Consequently with each quarter-turn of the head a quarter-turn is imparted to the shaft, bringing a new notch into operative position, the purpose of which will now be more specially referred to. A block $k$ is suitably secured to the saddle, and within it are arranged four slides $k'$, of like construction, each having therethrough rectangular orifices $k^2$, through which the shaft $j^3$ passes and in which the notch of the shaft is located. Each of these slides is provided with a spring-actuated headed pin $k^3$, which normally rests against the slide of the shaft $j^3$ and drops into one of the notches $j^4$ when the shaft is in a proper position. The purpose of this spring is to throw the slide $k'$ out from the face of the block $k$, as shown in Fig. 6, when the said notches are opposite the pin. These projecting slides are for engagement with adjustable stops $k^4$ of a stop-slide $l$, which in turn operates through mechanism which disengages the driving device of the feed-shaft.

As will be apparent, but one of the slides $k'$ can project out at a single time, and, as before stated, there is one slide for each tool of the head. If it is desired to do continuous plain work and not employ the automatic stopping device, I throw out the slides $k'$ from engagement with the shaft $j^3$, and thus prevent any contact with the stop-slide $l$. This is accomplished (see Figs. 6 and 7) by providing in one edge of each slide a shouldered recess $l'$, into which a portion of the transverse rocker-shaft $l^2$ is located, said rocker-shaft having an operating-handle $l^3$, as clearly appears in Fig. 6. The shaft $l^2$ is quartered out, as appears in Fig. 7, to form a shoulder to engage the shoulder of the recess $l'$. Consequently if said shaft $l^2$ were turned to the right from the position shown in Fig. 7 the slides would all be drawn back into the block $k$, whereas if it were left as shown in said figure the slides would operate back and forth in accordance with the movement of the turret-head.

Referring to Figs. 8 and 10, it will be seen that the slide $l$ is mounted in suitable ways of a dovetailed bracket $l^4$, secured to the cross-rail of the machine. A lug $m$ is formed on the rear side of the slide and projects through an orifice $m'$ of one of the brackets $l^4$. Spring-actuated adjustable stop-pins $m^2$ are secured in the bracket and project therefrom into the orifice against the lug $m$, before mentioned, in a manner to normally retain this lug and its slide in a central position. This construction permits of the movement of the slide, its lug, and the pin against the resistance of the spring of the pin until said lug comes up against an adjustable stop-screw $m^3$ of the orifice. It will further be apparent that the pins in question may be adjusted by the screws $m^3$ so that any tension may be had and that the lug may be normally held in any desired position with relation to the orifice.

The stops $k^4$ are made longitudinally adjustable on the slide $l$ by being detachably clamped in longitudinal slots $m^4$. It is by reason of this adjustment that the variance in the length of movement of the cutting-tools is obtained—that is to say, if the particular tool in question is to take a long cut from the center to the right, as shown in Fig. 1, the particular stop governing the movement would be adjusted to the right end of the slide sufficiently to give the length of movement desired. The novel connections between the slide and the worm-shaft, whereby the latter is thrown out of operation by a movement of the former, will be best understood by reference to Figs. 8, 9, and 10. The normal or idle position of the worm $f'$ is central, as shown in Figs. 9 and 10, being held so by reason of centralizing-buffers $n$ and $n'$, one located above the casing of the worm-shaft and one below. These buffers are alike in construction and similar to those employed for controlling the position of the slide $l$, comprising a suitable casing rigidly secured to the bracket of the rail and having therein a spring-actuated headed pin $n^2$, projecting outward against the extension $e^4$, the tension of said spring being adjustable by reason of the screw $n^3$. It will thus be apparent that if the worm is in a lowered position the spring of the lower buffer will be contracted, while the pin of the upper buffer will be in the position shown in the drawings. Assuming, for convenience, that the worm $f'$, before described, is in engagement with the gear $f^4$ of the screw-shaft $g'$ and the latter is being driven thereby, feeding the turret-head and its slide crosswise, the link $n^4$, pivoted to the extension $e^4$, will likewise be lowered, with the result that the notch $o$, in the extreme upper end thereof, will be down and the shouldered pin $o'$ of the bell-crank lever $o^2$ will be in engagement with said notch, holding the link and the worm down against the resistance of the coil-spring of the lower buffer $n'$. The free end of the bell-crank lever $o^2$ is provided with a roll which when the parts are in this position normally rests in a V-shaped notch (see Figs. 1, 8, and 10) of the bracket $o^3$, secured to the stop-slide. It will thus be apparent that the moment the stop-slide is engaged and moved laterally this bracket will likewise move the roll down and the pin $o'$ outward away from the link $n^4$, permitting the spring of the buffer $n'$ to force the work upward out of engagement with the gear $f^4$, thus discontinuing the driving movement.

Referring to the automatic stop mechanism for the vertical feeding movement of the cutting-tool, it will be observed (see Figs. 4 and 6) that the connections are made with the shaft $j$, before mentioned, and consist of a pair of spiral gears $o^4$ to drive a transverse shaft $p$, which, like the shaft $j^3$, before mentioned, is provided with a series of notches to accommodate a series of slides $p'$, (see Figs. 4 and 5,) which are mounted in the bracket $p^5$, secured to the turret-head slide. There are four of these slides $p'$, one for each tool of the head, and, as in the previous instance, they are adapted to engage adjustable stops $p^2$, mounted on a vertically-movable slide $p^3$, which latter is fitted in suitable ways and is provided with an adjustable buffer $p^4$ and adjustable stops $q$ to retard and limit the movement of said slide.

Calling attention especially to Fig. 5, it will be seen that upon the rear of the stop-slide $p^3$ is a recessed lug $q'$, in which is seated a roller $q^2$ of a spring-actuated pin $q^3$, mounted in the saddle of the slide. The rear end of this pin $q^3$ projects slightly and engages an arm $q^4$, secured to the rocker-shaft $r$, which is journaled in the brackets $l^4$, before mentioned. (See Figs. 5, 8, and 10.) This rocker-shaft extends across the rear of the cross-head, and upon the opposite end (see Fig. 10) is provided with a spring-actuated arm $r'$, bearing a pin $r^2$ to engage the shoulder $r^3$ of the link $n^4$, before mentioned. This pin $r^2$ when engaging the shoulder referred to serves to retain the worm-gear in the raised position in contact with the gear $f^3$ of the shaft $g$, which engagement drives the vertical feed of the head. Therefore it will be apparent that if the worm were held in engagement with said gear and one of the slides $p'$ would strike a stop $p^2$ of the slide $p^3$ the same would be given a lateral movement, causing the sliding pin $q^3$ to be forced rearward against the arm $q^4$, thus rocking the shaft, throwing this arm and pin out of engagement with the link, thus permitting the spring of the upper buffer $n$ to operate and throw the worm out of engagement with the gear $f^3$ and stop the same.

The worm-gear $f'$ can be thrown into engagement with either the gear $f^3$ or $f^4$ by a hand movement of a lever $r^4$, (see Figs. 10 and 11,) which is pivoted to the cross-rail of the machine and provided with a pin $s$, freely passing through the slot $s'$ of the link and engaging a trip-slide $s^2$. This trip-slide is clearly shown in Figs. 11, 12, and 13 and is fitted in a suitable recess in the slide of the link, where it is retained. It is provided with two beveled edges $s^3$, which when the parts are in the position shown in Fig. 10 register with the shoulders $o$ and $r^3$ of the link and prevent the pins from engaging said shoulder. If it is desired to place the worm into engagement with the gear $f^4$, the operator would shove the handle $r^4$ (which is shown broken away) backward, drawing down first upon the slide $s^2$ until the pin engaged the end of the slide of the link $n^4$, whereupon the link and the worm would be brought down against the gear until the pin $o'$ snapped into the shoulder $o$ of the top end of the link, which would hold the worm in such engagement until automatically released by the train of mechanism before recited or until stopped by the operator by the manipulation of this same lever $r^4$. It is obviously apparent that if the parts were in said lowered position and the front end of the lever were drawn forward or to the left the slide $s^2$ would be moved upward, causing the upper inclined shoulder $s^3$ to engage the edge of the pin $o'$ and force it out of the notch, thus leaving the parts free to be lifted to the normal position by the spring of the lower buffer. Connections with the top gear may be made by the use of the lever $r^4$ in substantially the same manner as described for connections with the lower gear. Said connections may be released independently of the automatic trip mechanism by a reverse movement of this same lever.

*Side-head mechanism.*—In addition to the front turret-head before mentioned I employ a side head, which, like the front head, may be provided with four cutting-tools of different characters and adapted to be used singly or successively, as the case may require. This head is also provided with a vertical and horizontal movement adapting it to perform the several offices required. The operative connections for moving this head in the several directions are made from the shaft $a^2$ (see Fig. 2) through bevel-gear connections with the horizontal shaft $s^4$, having gear connections, (not shown,) but inclosed by the casing $t$ (see Figs. 1 and 2) and driving the two vertical shafts $t'$ and $t^2$, which act in the same manner as the shafts $g$ and $g'$ of the front cross-rail, one affording the vertical movements of the head and the other the horizontal.

The side head $t^3$ is mounted upon a horizontal slide $t^4$, fitted in a vertically-movable saddle $t^5$. Said saddle in turn is mounted upon a rail $u$, secured to the main frame and at an angle to the front face of the frame of the machine. Therefore this head and its tool operate on the side and at an angle to the face or on a direct radial line from the center of the rotary table upon which the stock is placed. The saddle $t^5$, mounted upon the rail, is counterbalanced in the usual manner, having a chain connection $u'$ over a pulley and weight. (Not shown.) This side head is also provided with automatic stop mechanism for limiting both the vertical and the horizontal movement of the cutting-tools similar to that employed for the front head; but since said mechanism is substantially like that in the former instance I will not describe it in detail.

Referring to the side-head mechanism shown in Figs. 1, 15, 16, and 17, it will be seen that the saddle $t^5$ is provided with a lug-nut $u^2$, engaged by the screw-shaft $t'$ in a manner to be moved up and down, the same affording a vertical movement to the cutting-tool. In addition to this vertical movement a horizontal movement is also obtained from the shaft $t^2$ through a worm-and-gear connection $u^3$ with a gear $u^4$, meshing with the longitudinal rack $v$ in the slide $t^4$. The connection between the shaft $t^2$ and the pinion $u^4$ is made through the gear $v^5$, mounted upon the shaft $t^2$, and meshes with a gear $v^2$ on a worm-shaft $u^5$, which drives the gear $u^3$. These connections are made through a bracket $v'$, which extends up through the cross-rail, and to its outer end is secured an arm $v^3$, having an engaging pin $v^4$, whereby the sleeve may be turned upon the shaft and its worm thrown in or out of engagement with the worm-gear for a purpose which will next be described.

In addition to the horizontal movement imparted to the side turret-head from the shaft $t^2$ I provide an independent device for imparting a slight horizontal movement thereto in both a forward and back direction. The amount and line of each movement are determined by special-shaped guides, one of which I have illustrated in Figs. 1, 15, and 16 and designated as $w$. This guide is in the form of a detachable plate secured to the frame by bolts $w'$ and having a slot $w^2$ through its central portion. The particular shape of this slot determines the particular vertical line of travel of the cutting-tool. With a downward movement of the head, starting from the top with the special-shaped plate illustrated, said head would first be drawn outward and then gradually fed inward, producing an oval-finished surface upon the work operated upon, which is especially desired for finishing faced pulleys.

The connection between the slide $t^4$ and the slot $w^2$ of the plate $w$ will be understood from Fig. 16, wherein it will be seen that the slide is provided with a stud $w^3$, having a recess $w^4$ in its enlarged inner end and a pin central of said stud, with a roller $x$ mounted upon its extreme inner end, which latter engages the slot in the plate before mentioned and is the prime engagement which transmits the horizontal movement from the plate to the slide. If the tapering attachment is not in use and the direct vertical movement of the head is being employed, the roller $x$ is withdrawn from the slot $w^2$ by the projecting head $x'$ on the outer end of the pin. The same, as will be apparent, is adapted to be shoved in or out to engage or disengage the plate, as desired.

Having described the construction of my machine, I will now briefly refer to its method of operation.

As before stated, my machine is provided with both a front and a side tool-head. These cutting-tools are preferably arranged to operate alternately and not together, but are adapted to perform all the finishing required on an ordinary pulley. I will first refer to the operation of the front turret-head and later to the side head. The front turret-head may be provided with four different tools to perform different operations—as, for instance, it may contain a boring-tool, a threading-tool, a reamer, and a finishing-tool, all of which might be used on the same job, thus enabling the user to completely finish the top of a piece of work without taking it from the machine. Assuming for convenience that the work to be performed is that of boring and finishing a hub of a pulley wherein two or three tools would be employed, one to rough out the hole and the second and third to finish it, the casting for the pulley is first secured upon the rotary table and the turret-head is then revolved until the tool to be used is brought to position. The turret-head and its slide are next adjusted vertically and laterally until the tool is centrally located on the hub. This adjustment of the head is obtained by operating the detachable crank-handle $x^2$, (shown in Fig. 1,) which may be attached to the end of either the shaft $g$ or $g'$. With the parts in this position the lever $r^4$ would be operated to the right or left, throwing the worm $f'$ into engagement with the gear $f^3$ of the shaft $g$, which, as before stated, transmits a vertical movement to the turret-head. The particular stop $p^2$ on the slide $p^3$ for this tool is set in its proper relative position to give the desired amount of feed to the tools. When this tool of the head has been fed down through the hub, the slide $p'$ will have come into contact with the stop $p^2$, thus moving the stop-slide, operating the pin $q^3$, the rod $r$, releasing the link $n^4$ and its worm, thus discontinuing the downward movement. A reverse or withdrawal movement would then be imparted to the tool by a manipulation of the crank-handle $x^2$, before mentioned. The next tool may then be brought into play by the rotation of the turret-head, which, as will be apparent, would cause the withdrawal of the slide previously extended and project a second one, whereupon the downward feed would again be imparted to the tool and the former operations repeated. As will be apparent, the stops upon the slide $p^3$ when once set are left in the same position for duplicating similar work, which expedites the handling and finishing. After the hub of the pulley has been finished in the manner recited the surface of the face may be finished by the employment of a suitable cutting-tool in the side head $t^3$. This side head through mechanism previously recited is susceptible of both a vertical and horizontal movement, thus making it possible to surface off the face of a cylindrical body running from edge to edge, and by the use of the forming-plate $w$ an irregular surface may be produced on said face. This side head is provided with automatic stop and trip mechanism similar to that employed upon the front head and will not need to be gone into in detail, since it operates in substantially the same manner.

While I have referred to operating upon a pulley, it will be obvious that my machine is equally well adapted for other special branches of work wherein it is desired to finish both the surface and sides of a cylindrical body upon a single machine.

Having thus described my invention, what I claim, and desire to secure by Letters Patent, is—

1. In a vertical turret-lathe, the combination with a front turret tool-head adapted to move vertically and horizontally, of a side head situated to the rear of the front head and at an angle to the face thereof, and means for also feeding it both vertically and horizontally.

2. In a vertical turret-lathe the combination with a rotary table, of a side turret tool-head located to the rear of a front cross-rail and at an angle thereto, means for feeding said side head both vertically and horizontally, a front turret tool-head and means for feeding it vertically and horizontally, a trip mechanism whereby the length of the movement of each of said heads may be predetermined.

3. In a vertical turret-lathe, the combination with a rotary table, of a front turret tool-head, means for imparting thereto both vertical and horizontal movements, a side tool-head provided with a vertical feed, an adjustable guide-plate for transmitting both an oval and horizontal movement to said tool-head.

4. The combination in a vertical turret-lathe, of a rotary table, a front turret-head situated above said table, means for imparting to the said head both a vertical and a horizontal movement, a side turret-head, means for feeding it vertically, a guide-plate situated adjacent to said table and bearing connections therewith for moving the same laterally to produce an oval surface upon the stock.

5. The combination, with a rotary stock-table, of a turret-head located above the same, means for independently imparting thereto both a vertical and horizontal movement, automatic stop mechanism for determining the length of both the vertical and horizontal movement of the head, a side turret-head located at an angle to the face of the front turret-head, means for imparting thereto a vertical movement, a slide to which the head is secured, a detachable guide-plate having an oval-shaped slot therein and a detachable pin connecting the slide and slot whereby the head is given a corresponding oval movement.

6. The combination in a vertical turret-lathe, of a rotary table, a turret-head situated above said table, means for imparting thereto both a vertical and horizontal movement, automatic mechanism for controlling the length of said movements, a horizontally and vertically movable side turret-head located at an angle to the front head and on a central radial line of the table, a forming attachment for said side head comprising a detachable plate having a special-shaped slot therein, connections between said slot and head whereby the horizontal movement of the latter is controlled by the shape of the slot in the plate.

7. The combination in a vertical turret-lathe of a rotary table and a front turret-head, of a side head, means for imparting thereto both a vertical and horizontal movement, a forming attachment comprising a plate having a special-shaped slot therein, a stud in the slide for the head, a pin mounted in said stud bearing a roller to engage the slot of the plate and means for disengaging said pin and roller from the said plate, substantially as described.

8. In a machine of the class described, the combination with a rotary holder, of a central cutting-tool, means for imparting thereto both a vertical and horizontal movement, a side head located adjacent to the holder and at the rear of the front head, a slide upon which the head is mounted, means for moving the head vertically with relation to the stock upon the holder, a stud carried by the slide, a pin slidably mounted within the stud bearing a roller upon its inner end and a detachable guide-plate bearing a special-shaped slot for engagement with the roller.

9. In a machine of the class described, the combination with a rotary stock-carrier, of a turret-head and means for moving it both vertically and horizontally, a slide upon which the head is mounted, a shaft rotated by the turret-head and bearing a series of notches, slides adjacent to the shaft and adapted to be moved longitudinally by the notches, a movable slide bearing a series of adjustable stops for engagement by said notch-slides and connections between said stop-slide and a driving-shaft whereby the movements of the head may be stopped.

10. In a vertical turret-lathe, the combination with a rotary stock-carrying table, of a turret tool-head adjacent thereto, a series of contact-slides operated successively by the rotary movement of the head, a slide carrying a series of adjustable stops for said slides, a driven shaft bearing a worm for driving the feed-shafts of the turret-head, means for normally holding said worm in engagement, connections between the slide and worm-shaft whereby its worm is disconnected from the shaft, substantially as described.

11. In a vertical turret-lathe, the combination with a rotary stock-carrying table, of a turret-head, a saddle therefor, a series of miniature projectable slides operated by the head, connections between said slides and the turret-head whereby they may be successively extended, a series of adjustable stops for engagement by the said slides, a movable slide upon which the stops are mounted, a driving-shaft with detachable connections for imparting a movement to the turret-head, a link connected to said driving-shaft, an arm to engage the link, connections between the stop-slide and arm whereby the link may be disconnected from the arm by a movement of the stop-slide, substantially as described.

12. In a machine of the class described, the combination with a turret-head, of a saddle in which the same is mounted, a series of movable contacts carried by said saddle, a movable slide bearing a series of adjustable stops in line with the movement of said contacts, a lever for engagement by said stop-slide, a link for engagement with the lever, a driven shaft connected with the link, connections from said shaft whereby the turret-head is moved horizontally, the whole arranged to operate as and for the purpose described.

13. In a machine of the class specified, the combination with a turret-head, of a series of projectable contact-slides, means for operating them with the rotation of the head, a stop-carrying slide mounted adjacent to said projectable members, means for adjusting and determining the amount of movements of said slide, a bell-crank arm for engagement by said slide carrying a pin to engage the shoulder of the link, a link interposed between said pin and a worm-shaft whereby the latter is held into engagement with the gear upon the feed-shaft for moving the head, means for operating them with the rotation of the head, a stop-carrying slide mounted adjacent to said projectable members, means for adjusting and determining the amount of movements of said slide, a bell-crank arm for engagement by said slide carrying a pin to engage the shoulder of the link, a link interposed between said pin and a worm-shaft whereby the latter is held into engagement with the gear upon the feed-shaft for moving the head, means for automatically disengaging the worm from the gear when the slide is moved by the head to release the link.

14. The combination with a turret-head of a driven shaft having connections with a shaft for feeding the head horizontally, means for normally holding said driven shaft out of operative engagement, means for holding said shaft into operative engagement, a trip-slide interposed between said latter mechanism and the head whereby said mechanism is released at a predetermined position of the head and the driving medium disconnected, substantially as shown and described.

15. The combination with a turret-head of the class described, of shafts for feeding it both vertically and horizontally, a driving-shaft interposed between the two and for engagement therewith, means for normally holding said driving-shaft out of engagement with said shafts, means for holding said shaft operatively in engagement with either of said feed-shafts, movable stop-slides interposed between said latter mechanism whereby the driving mechanism is disconnected from either of said shafts by a movement of either of said slides, substantially as shown and described.

16. The combination with a turret-head, of shafts for feeding the same carrying gears, a driven shaft bearing a worm interposed between said gears and adapted for engagement with one or the other, a link for raising or lowering said worm into engagement with said gears, means for engaging the link and holding it in said raised or lowered position and trip mechanism interposed between the link and the head whereby the link is released with a predetermined movement of the head and the parts disconnected.

17. The combination with a turret-head carrying projecting slides, of a slide carrying adjustable stops for engagement with said slides, a driven shaft adapted to engage and disengage the driving-shafts for the feeding movements of the head, means interposed between the shafts and the slide whereby said shaft is put into engagement for feeding the head, mechanism for automatically releasing said engagement at a predetermined feed movement of the head and means for disengaging said parts by a hand movement.

18. The combination with a turret-head and a driven shaft whereby power may be applied for feeding the head, a link and lever for placing said driven shaft into engagement for feeding the head, connections for normally holding said parts in such engagement, a movable slide carrying adjustable stops for projectments operated by the movement of the head, connections between the slide and the link whereby the latter is released by a movement of the slide, a trip-slide connected with the lever whereby the parts may be disconnected independently of said head.

19. The combination with a turret-head, of a slide upon which it is mounted for moving it laterally, a series of projectments successively operated with the setting of the head, a movable slide carrying a series of adjustable stops for engagement by said projectments, a spring-actuated pin for engagement with the slide, a rocker-shaft bearing an arm for engagement with said pin, an arm upon the opposite end of said rocker-shaft, a link for engagement by the latter arm, an adjustable driven shaft connected with the link adapted for engagement with the gear of the feed-shaft of the turret-head.

20. The combination with a turret-head and a stock-carrying table, of a movable slide adjacent thereto carrying a series of adjustable stops for engagement by projectments of the slide, means for controlling the adjustment of said stops by the head, a rocker-shaft operated by the movement of the slide, a driven shaft bearing connections for feeding the head, connections between the driven shaft and the rocker-shaft whereby the former is held into said operative engagement but whereby said parts are disconnected at a predetermined movement of the head.

21. The combination with a turret-head and means for feeding it both vertically and horizontally, comprising feed-shafts, a driven shaft arranged for adjustment to and from either of said feed-shafts, spring-actuated buffers for normally holding said driven shaft out of engagement with said feed-shafts, clutch mechanism for driving said shafts in either a forward or backward direction, a lever bearing a link, connections with said driven shaft for adjusting the same, means for engaging said link in either of its extreme adjusted positions, connections between said means and the head whereby said means may be released and the driving-shaft disconnected with either a predetermined vertical or horizontal movement of the head.

22. The combination with a turret-head and means for feeding the same in either a vertical or horizontal direction, of an adjustable driving-shaft for transmitting the power for either of said movements, a link connected with said adjustable shaft and a lever connected with said link for operating the same and its shaft, notches upon the link, spring-actuated arms bearing pins for normally engaging one or the other of said notches to retain the link and its shaft in an engaged position, connections between the arm and the turret-head whereby the former are operated to release the link at a predetermined extreme movement of the head.

23. In a machine of the class described, the combination with a turret-head, of a saddle in which the same is mounted, a series of movable contacts carried by said saddle, a movable slide bearing a series of adjustable stops in line with the movement of said contacts, a rock-shaft for engagement with said slides to withdraw them out of engagement with the stops, connections between said stop-slide and a driven shaft whereby the latter is drawn in or out for engagement with the feed-shafts and for the purpose described.

24. The combination with a turret-head, of a driven shaft having connections with a shaft for feeding the head, means for normally holding the driven shaft out of operative engagement, mechanism for holding said shaft into operative engagement, a trip-slide interposed between said latter mechanism and the head, whereby said mechanism may be released at a predetermined position of the head, and means for throwing out the contacts for said slides to prevent the movement of the latter and the releasement of the engagement before recited.

Signed at Bridgeport, in the county of Fairfield and State of Connecticut, this 19th day of February, A. D. 1901.

EDWARD PAYSON BULLARD, Jr.

Witnesses:
 C. M. NEWMAN,
 D. B. BULLARD.